April 13, 1954    L. G. ROBERTS ET AL    2,674,784
COMMUTATOR
Filed April 25, 1951

Inventors
LLEWELLYN GEORGE ROBERTS
WALTER HENRY WEBB
JOHN LAWTON RAMSEY

By
Attorney

Patented Apr. 13, 1954

2,674,784

UNITED STATES PATENT OFFICE 2,674,784

COMMUTATOR

Llewellyn George Roberts, Walter Henry Webb, and John Lawton Ramsey, London, England, assignors to Watliff Company Limited, London, England, a British company Application April 25, 1951, Serial No. 222,767

2 Claims. (Cl. 29—155.54)

This invention relates to commutators. The object of the invention is the provision of improvements in commutators and especially of an improved method of making them. The invention comprises a method of making a commutator, which comprises forming a cylindrical metal blank with radial slits therein which partially divide the blank into segments but leave metal uniting said segments, moulding insulating material into association with the slitted blank, so that it flows into the slits and also forms a bond capable of independently uniting the segments, subsequently cutting away the metal uniting the segments, thereby leaving said segments insulated from each other while being bonded together by said insulating material, and subsequently adding a core which also bonds the segments together.

The invention further comprises a commutator comprising a plurality of segments bonded together by a core of insulating moulding material, and having insulating moulding material between them wherein the material which forms said core and that which is between said segments are different materials, selected according to the properties required of a bonding material and of an intersegment insulating material.

The invention further comprises a commutator comprising a plurality of segments with insulating moulding material between them, said segments being bonded together by means of a metal core comprising two elements abutting against the flanks of the assembly of segments and united by a bush passing through the centre of the assembly.

In order that the invention may be the more clearly understood, a commutator in accordance therewith, and the method of making the same, will now be described reference being made to the accompanying drawings, wherein.

Figure 1:
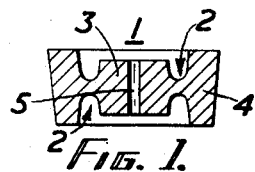
Figure 1 is a section, on line I—I of Figure 2, of a blank from which the commutator segments are formed.
Figure 2:
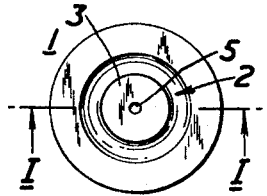
Figure 2 is a face view of the same.

Referring to the drawings we first provide a cylindrical blank 1 of the material (say copper) of which the commutator segments are to be formed. This blank is shown in Figures 1 and 2. It will be see that it is not exactly cylindrical but that its periphery is slightly tapered. In each of its faces it is formed with an annular groove 2, and the inner or hub portion 3 of the blank inside the grooves 2 is less deep in the axial direction than is the outer portion 4 outside said grooves. A small hole 5 passes axially through the blank, or alternatively a dimple can be formed in the blank for centering the drill in the next operation.

Figure 3:
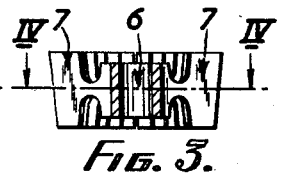
Figure 3 is a section, on line III—III of Figure 4, of the blank after it has been subjected to given machining operations.
Figure 4:
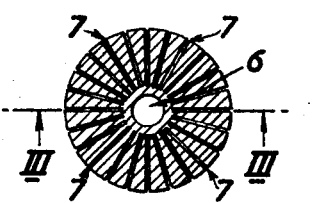
Figure 4 is a section of the same on line IV—IV of Figure 3.

We then drill a pilot hole 6 coaxially through this blank, and form cuts 7 in radial planes in said blank, which cuts extend from the circumferential periphery nearly, but not quite far enough to break, into the pilot hole. These cuts 7 are equally spaced and their number is the same as the number of segments which the commutator is to comprise. The work piece is now as illustrated in Figures 3 and 4.

Figure 5:
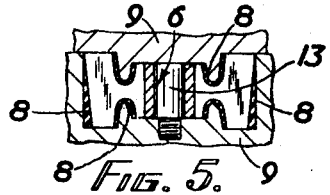
Figure 5 is a similar view to Figure 3 showing the machined blank in a mould during an initial moulding operation.

Moulding material 8 is next moulded, under pressure and heat, round the circumferential periphery and into the radial cuts 7, and also, as a relatively thin layer lining the surfaces of the grooves 2. This operation is illustrated in Figure 5 which shows the mould 9, and it will be seen that the layer of the moulding material which surrounds the circumferential periphery has a cylindrical outer surface, and, where there is tapered formation of the blank, varies in thickness. Its section is arranged to be strong enough to withstand the subsequent operations without fracture, but otherwise it should be of minimum possible thickness.

Figure 6:
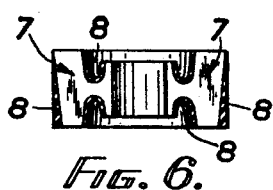
Figure 6 is a similar view of the same after it has been removed from the mould and subjected to a further machining operation.

The pilot hole 6 is then enlarged by machining so as to cut away all the metal separating said pilot hole from the inner ends of the radial cuts. The product, which is as illustrated in Figure 6 now comprises a set of segments electrically insulated from each other by the moulding material in the cuts 7 and held together by an outside band of moulding material round the circumferential periphery, as well as by the layer which lines the face grooves 2.

Figure 9:
Figures 9 and 10 are respectively a side view and a face view of the finished commutator.
Figure 8:
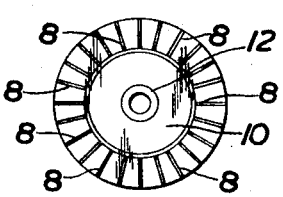
Figure 8 is a face view of the same.
Figure 10:
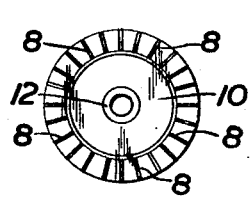

Next a second moulding operation is performed by which a moulding material 10 is moulded into the now enlarged pilot hole 6 and over the two end faces to a level flush with the outer portion 4 of the workpiece. The material 10 will of course fill the face grooves 2, and before this second moulding operation reinforcing steel rings 11 are placed in said grooves so as to be embedded in said moulding material 10. It will be seen that the moulding material 8 prevents these rings 11 from making contact with the copper segments. Said moulding material 10 also serves to mould a metal bush 12 coaxially in the enlarged pilot hole and insulated from the segments, the said bush being for the purpose of mounting the commutator on its shaft. Finally the band of moulding material 8 round the circumferential periphery is machined away, leaving the segment surfaces exposed, and said segment surfaces are at the same time machined truly cylindrical. The commutator is now complete, as shown in Figures 9 and 10, and it will be seen that the segments have insulating moulding material 8 between them, and are bonded together by means of the core of insulating moulding material 10 within the pilot hole and extending over the two end faces.

It will be noted that the moulding material 8 which fills the spaces between the segments, and the moulding material 10 which forms the core bonding the segments together, are injected at two different stages of the process. This has the great advantage that two different moulding materials can be employed, the material 8 which fills the spaces between the segments having non-tracking, high temperature and arc resisting qualities, and the material 10 which forms the bonding core being a thermo-setting plastic material of high strength and stable under heat, so that it will retain the body of segments undistorted under high centrifugal stresses as well as under high temperature stresses. No one moulding material is at present known which has all these qualities in suitable degree. Material, for example, which is suitable as a segment separator is not sufficiently strong mechanically to act as the bonding core.

It will be seen that owing to the grooves 2, the segments are formed so as to key with the moulding material 10.

Describing now certain details of operation, the radial cuts may be made by a circular or band saw while the blank is mounted on a dividing head or plate which enables it to be indexed round step by step so that the appropriate number of cuts, correctly spaced, are made.

For locating the blank in the mould 9, a register peg 13 may be employed fitting in the pilot hole 6.

For enlarging the pilot hole and thereby cutting away the metal separating said pilot hole from the inner ends of the radial cuts, the workpiece is mounted in a suitable machine by chucking on to the outer band of moulding material 8, and a drill of appropriate size is passed through said pilot hole.

As an alternative the annular grooves 2 could be machined while the cylinder is still in blank form, or they could be machined after the radial cuts have been made, say at the same time as the pilot hole 6 is enlarged. This latter arrangement however will involve further complications if the separate reinforcing rings 11 are to be employed.

It is to be understood that the segmented blank could be produced by entirely other methods than those described such as for example a rolled up strip of metal with suitable teeth formed therein to make segments of the shape required.

Figure 7:
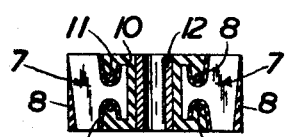
Figure 7 is a similar view to Figure 6 after the completion of a further moulding operation.
Figure 11:
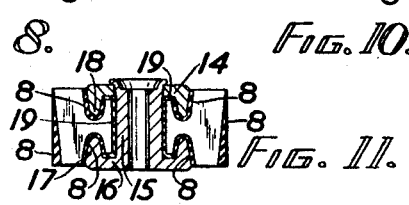
Figure 11 is a similar view to Figure 6 after completion of an operation which is an alternative ot the further moulding operation illustrated in Figure 7.

Referring to Figure 11, this illustrates an alternative process according to which, after the stage illustrated in Figure 6, instead of effecting the second moulding operation illustrated in Figure 7 and thereby providing a core of insulating moulding material, a conventional type of metal core is added.

This metal core is shown as consisting of a steel ring 14 and a steel bush 15 provided at one end with a head 16. The bush 15 is passed through the centre hole of the assembly of segments illustrated in Figure 6 until its end projects from said centre hole and its head abuts against one flank of the assembly. The ring 14 is then threaded over the projecting end of the bush until it abuts against the other flank of the assembly, and finally the projecting end of the bush is riveted over the ring as clearly shown.

The head 16 is formed with an annular ridge 17 which fits in the one groove 2 and abuts against the moulding material 8 which lines it, and the ring 14 is formed with a similar annular ridge 18 which fits in the other groove 2 and abuts against the moulding material 8 which lines it. Further insulating material 19, which may consist of mica, is provided between the headed bush and ring on the one hand, and the exposed inner surfaces of the segments on the other.

The arrangement of Figure 11 may be modified in that the moulding insulating material 8 lining the grooves 2 may be omitted, and the whole of the insulating material between the headed bush and ring on the one hand and the segments on the other, may be constituted by separately added material such as mica, in the conventional way.

After the stage of Figure 11 the band of moulding material 8 round the circumferential periphery is of course machined away as previously described with reference to Figures 9 and 10.

It will be seen that this invention provides a segmental structure which can be fitted to almost any type of mounting core, be it either of the moulded plastic or the conventional conical headed steel bush and ring.

Another advantage of the invention lies in the elimination of the temporary metal retaining or compression rings normally used in the manufacture of commutators, which necessitates operations of pressing into and out of such rings during the stages of manufacture.

The invention also provides simple means of insulating and accurately locating any reinforcing rings of steel or other materials arranged so as to relieve the core material of bursting stresses, and it thus overcomes one of the greatest difficulties in this form of construction.

What is claimed is:
1. In a method of making a commutator the steps comprising forming a substantially cylindrical metal blank with coaxial annular indentations in the ends thereof and with radial slits therein which partially divide said blank into segments but leave metal bridges uniting said segments, performing a first molding operation by which insulating molding material flows into said slits and also forms a lining for each of said annular indentations, subsequently cutting away the metal bridges thereby leaving said segments insulated from each other while being bonded together by said insulating molding material, thereupon locating reinforcing metal rings in said annular indentations, and finally performing another molding operation by which insulating molding material of a different character from the first insulating molding material is applied so as to form a core which bonds said segments together and in which said reinforcing metal rings are embedded.

2. A method of making a commutator which comprises the steps of forming a slightly tapered cylindrical metal blank with coaxial annular indentations in the two face ends thereof and with radial slits therein dividing said blank in a plurality of segments joined by bridge portions, performing a first molding operation by which insulating molding material is caused to flow into said slits and also to line the outer side wall of the blank and the two indentations in the face ends thereof, subsequently cutting a centric hole through the blank so as to remove the said bridge portions thereby leaving said segments insulated from each other but bonded together by said insulating molding material, thereupon fitting reinforcing metal rings in said annular indentations, performing a second molding operation with a molding material of a character different from that of the first molding material, the said second molding operation forming a core lining for said centric hole thereby bonding the segments together and filling said indentations thereby embedding the rings in the second insulating material, and finally machining the outer wall of the blank so as to remove the lining thereon for exposing the outer faces of the segments and to give the blank a cylindrical configuration.

References Cited in the file of this patent

UNITED STATES PATENTS

| Number | Name | Date |
|---|---|---|
| 435,504 | Lieb | Sept. 2, 1890 |
| 1,195,861 | Smith | Aug. 22, 1916 |
| 1,233,764 | Dunham | July 17, 1917 |
| 1,284,362 | Kempton | Nov. 12, 1918 |
| 1,768,654 | Apple | July 1, 1930 |
| 1,845,115 | Apple | Feb. 16, 1932 |
| 2,061,821 | Apple | Nov. 24, 1936 |
| 2,141,268 | Dunbar | Dec. 27, 1938 |
| 2,251,326 | Cullin | Aug. 5, 1941 |